(12) United States Patent
Koren et al.

(10) Patent No.: US 8,908,704 B2
(45) Date of Patent: Dec. 9, 2014

(54) SWITCH WITH DUAL-FUNCTION MANAGEMENT PORT

(71) Applicant: Mellanox Technologies Ltd., Yokneam (IL)

(72) Inventors: Benny Koren, Zichron Yaakov (IL); Carlos Nemerovsky, Rehovot (IL); Ran Shani, Hod Hasharon (IL); Ido Bukspan, Herzliya (IL)

(73) Assignee: Mellanox Technologies Ltd., Yokneam (IL)

( * ) Notice: Subject to any disclaimer, the term of this patent is extended or adjusted under 35 U.S.C. 154(b) by 164 days.

(21) Appl. No.: 13/755,137

(22) Filed: Jan. 31, 2013

(65) Prior Publication Data

US 2014/0211808 A1 Jul. 31, 2014

(51) Int. Cl.
*H04W 4/00* (2009.01)
*H04L 12/24* (2006.01)
*H04L 12/931* (2013.01)
*H04L 12/935* (2013.01)
*H04L 29/08* (2006.01)

(52) U.S. Cl.
CPC ............. *H04L 41/00* (2013.01); *H04L 49/356* (2013.01); *H04L 67/26* (2013.01); *H04L 49/30* (2013.01)

USPC .......................................................... 370/401

(58) Field of Classification Search
CPC ........ H04L 49/30; H04L 49/356; H04L 67/26
See application file for complete search history.

(56) References Cited

U.S. PATENT DOCUMENTS

2004/0202189 A1* 10/2004 Arndt et al. ................... 370/409

* cited by examiner

*Primary Examiner* — John Blanton
(74) *Attorney, Agent, or Firm* — D. Kligler I.P. Services Ltd.

(57) ABSTRACT

Communication apparatus includes a switch, which includes switching logic, multiple ports for connection to a network, and a management port, and which is configured to assign both a first link-layer address and a second link-layer address to the management port. A host processor includes a memory and a central processing unit (CPU), which is configured to run software implementing a management agent for managing functions of the switch. A network interface controller (NIC) is connected to the management port and is configured to convey incoming management packets, which are directed by the switch to the first link-layer address, to the CPU for processing by the management agent, and to write directly to the memory data contained in incoming remote direct memory access (RDMA) packets, which are directed by the switch to the second link-layer address.

18 Claims, 2 Drawing Sheets

SWITCH WITH DUAL-FUNCTION MANAGEMENT PORT

FIELD OF THE INVENTION

The present invention relates generally to computer networks, and particularly to packet switches that are used in such networks.

BACKGROUND

Modern high-performance switches for packet networks generally include a management agent, which answers queries and implements configuration requests. In InfiniBand (IB) networks, for example, switches are required to have a subnet management agent (SMA), which communicates with the subnet manager (SM), and the switch may support other types of management agents, as well. The SMA is a software entity, which is typically implemented on a suitable central processing unit (CPU). The CPU may be embedded in the switch or it may be connected externally.

To support management communications, IB switches are required to implement port 0 (zero) as a management port, to which management packets directed to the switch can be addressed. For this purpose, port 0 has its own local identifier (LID—the link-layer address in IB networks), which is assigned to it by the SM. When the SMA runs on an embedded CPU within the switch, port 0 is an internal switch port; otherwise, port 0 is configured for connection to an external CPU chip. In accordance with the IB transport protocol, packets are transmitted to and from port 0 using two queue pairs (QPs): QP0 for receiving and sending subnet management packets (SMPs) to and from the subnet manager (SM), and QP1 for general management packets (GMPs), which are used for other management functions. These management packets are referred to collectively as management datagrams (MADs).

When a MAD arrives at any port of the switch other than port 0, the receiving port checks whether the destination address (i.e., the destination local identifier—DLID) corresponds to port 0. If so, the packet is forwarded internally by the switch to QP0 or QP1 on port 0 for processing by the SMA or other management agent. Similarly, management agents of the switch may respond to queries and send event notifications by sending outgoing packets via QP0 or QP1 of port 0, which the switch then forwards to the network via the appropriate output port.

SUMMARY

Embodiments of the present invention provide apparatus and methods that enhance the capabilities of network switches.

There is therefore provided, in accordance with an embodiment of the present invention, communication apparatus, including a switch, which includes switching logic, multiple ports for connection to a network, and a management port, and which is configured to assign both a first link-layer address and a second link-layer address to the management port. A host processor includes a memory and a central processing unit (CPU), which is configured to run software implementing a management agent for managing functions of the switch. A network interface controller (NIC) is connected to the management port and is configured to convey incoming management packets, which are directed by the switch to the first link-layer address, to the CPU for processing by the management agent, and to write directly to the memory data contained in incoming remote direct memory access (RDMA) packets, which are directed by the switch to the second link-layer address.

Typically, the NIC is also configured to convey outgoing management packets from the management agent to the switch for transmission over the network, and to generate outgoing RDMA packets for transmission via the switch over the network.

In some embodiments, the management agent is configured to send, via the switch over the network to a subnet manager, a subnet management packet containing port numbers of at least some of the multiple ports, including different first and second port numbers that are both assigned by the switch to the management port, thereby causing the subnet manager to assign the first link-layer address to the first port number and the second link-layer address to the second port number. In one embodiment, the first port number is port zero.

In disclosed embodiments, the switch is configured, upon receiving an incoming management packet directed from the network to the first link-layer address, to encapsulate the incoming management packet before conveying the encapsulated incoming management packet to the management port, while incoming packets directed from the network to the second link-layer address are conveyed by the switch to the management port without encapsulation. In one embodiment, the switch is configured to direct the incoming management packets, after encapsulation, to a first queue pair (QP) for processing by the NIC, while directing the incoming RDMA packets to one or more second QPs, different from the first QP, for processing by the NIC.

Additionally or alternatively, the NIC is further configured to decapsulate the encapsulated incoming management packet before passing the incoming management packet to the CPU for processing by the management agent and, upon receiving an outgoing management packet directed from the management agent to the network, to encapsulate the outgoing management packet before conveying the encapsulated outgoing management packet via the management port to the switch.

There is also provided, in accordance with an embodiment of the present invention, a method for communication, which includes assigning both a first link-layer address and a second link-layer address to a management port of a switch, which includes multiple ports for connection to a network. A host processor, including a memory and a central processing unit (CPU), which runs software implementing a management agent for managing functions of the switch is coupled to the management port. Incoming management packets, which are directed by the switch to the first link-layer address, are conveyed via the management port to the CPU for processing by the management agent. Data contained in incoming remote direct memory access (RDMA) packets, which are directed by the switch to the second link-layer address via the management port, are written directly to the memory.

The present invention will be more fully understood from the following detailed description of the embodiments thereof, taken together with the drawings in which:

DETAILED DESCRIPTION OF EMBODIMENTS

Figure 1:
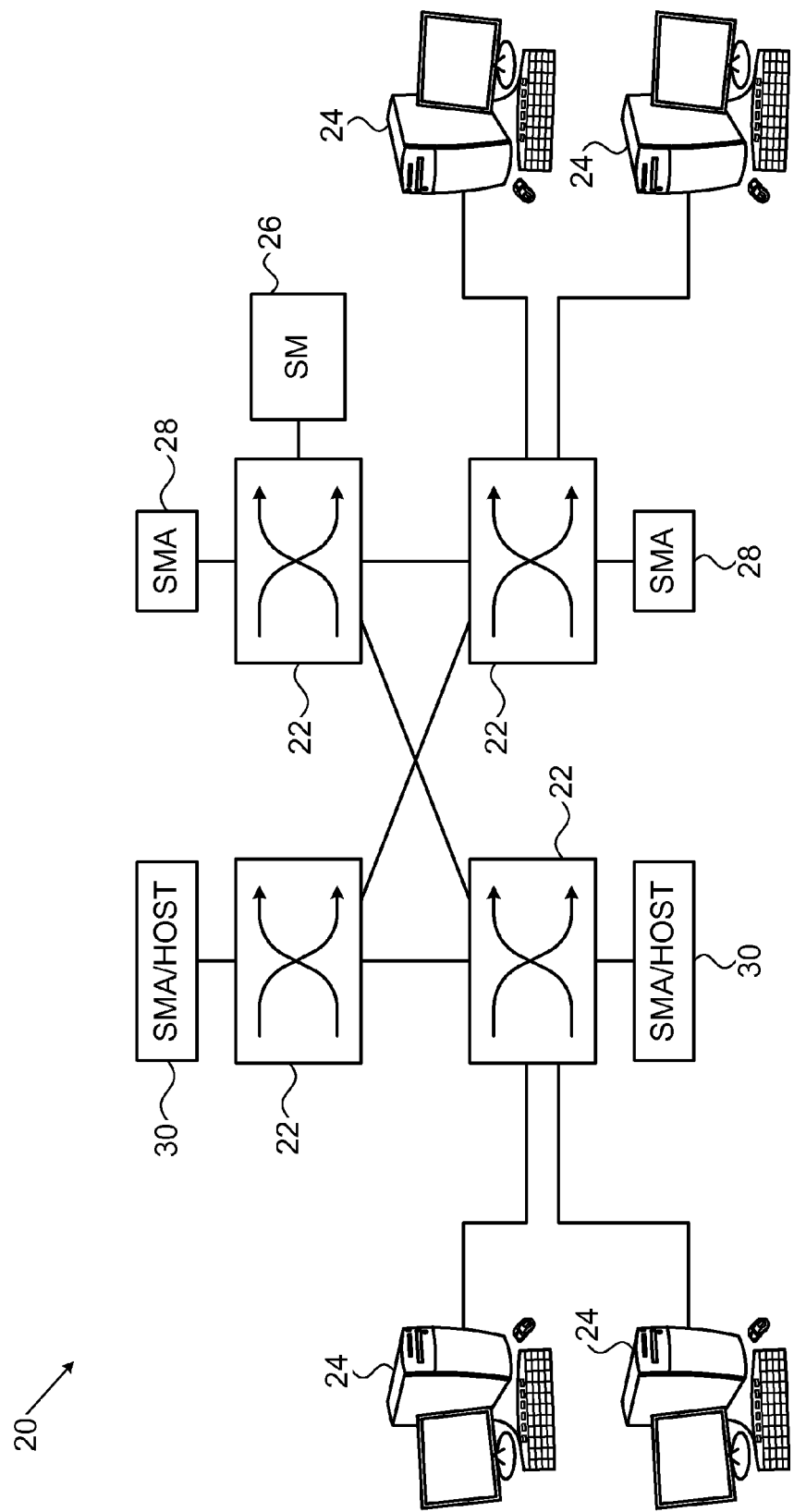
FIG. 1 is block diagram that schematically illustrates a managed computer network, in accordance with an embodiment of the present invention.

In large-scale, high-performance data centers, there is a need to take maximal advantage of all available computing resources. At the same time, CPUs and switch ports that are dedicated exclusively to network management functions may be underutilized. The requirements of network management protocols, however, make it difficult to divert management resources to support application-level software functions, and this difficulty is exacerbated by the need to protect against unauthorized access to management functions by network users.

Embodiments of the present invention address these difficulties in a way that makes a management CPU, which is attached to a switch, available for application functions. In particular, these embodiments permit a single port of the switch, to which the management CPU and its memory are attached, to receive and transmit both management traffic and application traffic, such as remote direct memory access (RDMA) packets, which are a key element in high-performance distributed applications. This dual functionality may be accomplished by creating, within the switch, two logical ports on the physical port that is dedicated to the management CPU—one port for management traffic and the other for application traffic. As a result, the computing power of the management CPU can be more fully exploited while maintaining compatibility with existing management protocols and security requirements.

In a disclosed embodiment, a switch comprises switching logic and multiple ports for connection to a network, as well a management port for connection to a host processor that performs management functions. The switch assigns two different link-layer addresses to the management port. (The term "link layer" is used, in the context of the present patent application, in its conventional sense to refer to Layer 2 in the Open Systems Interface model; thus, a "link-layer address" is a LID in an IB network or a medium access control (MAC) address in an Ethernet network.) As noted above, one of these link-layer addresses is a management address, while the other is available for application packets.

The host processor comprises a network interface controller (NIC), which connects via a network link to the management port. This model differs most switches known in the art, in which the management processor is embedded in the switch or connected to the management port by a dedicated bus. The host processor comprises a memory and a CPU, which runs software implementing a management agent for managing functions of the switch. The NIC conveys incoming management packets, which are directed by the switch to the management address of the management port, to the CPU for processing by the management agent. At the same time, the NIC handles application packets, directed to the other link-layer address of the port, as would any other NIC in the network. Thus, for example, the NIC will write data contained in incoming RDMA packets directly to the host memory. The NIC handles outgoing management packets from the management agent running on the host and outgoing RDMA packets (and other application packets) in like manner.

In some networking standards, such as IB, link-layer addresses are assigned to physical ports by a central management entity, such as a subnet manager. To obtain the necessary addresses for both of the logical ports that are provisioned on the management port of the switch, the management agent sends to the subnet manager a subnet management packet that contains two different port numbers, both belonging to the same physical management port. In response to this packet, the subnet manager assigns two link-layer addresses to the same physical management port, one for each of the logical ports. Typically, the port configuration is handled internally by the switch, and the subnet manager is unaware that the two port numbers that are addressed in this manner actually belong to the same physical interface.

The switch and NIC are designed to maintain a clear separation between management traffic and application traffic passing through the management port. This separation ensures the security and integrity of management communications in the network, as well as allowing transmission of additional information about management packets, such as decisions and lookup results from the switch. For this purpose, upon receiving an incoming management packet directed from the network to the management address of the port, the switch typically encapsulates the incoming management packet (possibly adding relevant information) and passes it to the management port in this encapsulated form. Incoming packets from the network to the other link-layer address of the port, on the other hand, are typically conveyed by the switch to the management port without encapsulation. When the applicable network standard mandates the use of particular QPs for management communications, as in IB networks, the switch directs the management packets to an appropriate QP for processing by the NIC, while directing incoming RDMA and other application packets to other, different QPs as dictated by the packet headers and host software—without invoking any special functionality of the switch.

The NIC performs at least partial decapsulation of the encapsulated incoming management packets, and thus passes the decapsulated packets to the CPU for processing by the management agent. (In some embodiments, as described hereinbelow, the decapsulation may be performed in two stages, by the NIC and then by the CPU, in order to recover the original incoming management packet.) By the same token, upon receiving an outgoing management packet directed from the management agent to the network, the NIC encapsulates the management packet (possibly after an initial stage of encapsulation by the CPU) before conveying it via the management port to the switch.

FIG. 1 is block diagram that schematically illustrates a managed computer network 20, in accordance with an embodiment of the present invention. Network 20 is described, for the sake of convenience and clarity, in terms of an IB subnet, but the principles of the present invention may similarly be applied, mutatis mutandis, in other types of Layer 2 networks, such as Ethernet networks, as well as in Layer 3 networks, in which multiple Layer 2 subnets are interconnected.

Network 20 comprises a fabric of switches 22, at least some of which connect to hosts 24, and possibly to other types of network nodes (not shown), as well. A subnet manager (SM) 26 performs management and administration functions. (Optionally, more than one subnet manager may exist in a given subnet to provide backup in case of failure, and other management entities may also be active in the network, but only the single SM 26 is shown and described here for the sake of simplicity.) SM 26 is typically a combined hardware/software element, comprising a computing platform, such as an embedded or stand-alone central processing unit (CPU) with a memory and suitable interfaces, which runs management software that performs the required functions in accordance with the applicable protocols. SM 26 assigns a Layer-2 address, in the form of a LID, to each port of each switch 22 and host 24 within the subnet. SM 26 learns the topology of network 20 using the applicable protocols, typically by transmission and reception of suitable management packets, for example Direct Route Management Datagrams, as defined by IB specifications. A subnet administration (SA) function of SM 26 provides nodes with information gathered by the SM, including communication of the LID information.

A SMA 28 in each node of network 20 responds to queries from SM 26 and receives the LID and other information distributed by SM 26. In at least some of switches 22 in the present embodiment, the function of the SMA is carried out by a host processor 30, which is attached by a network link to the management port of the corresponding switch. The host processor, which is described further hereinbelow with reference to FIG. 1, is available for use by software applications running on network 20, in addition to running the management software implementing the SMA of the corresponding switch. Host processor 30 may also serve as the agent for other management functions supported by the network. This sort of dual-function, attached host processor 30 may be connected to all of switches 22 in network 20, or only to certain switches, depending on system requirements and configuration.

Figure 2:
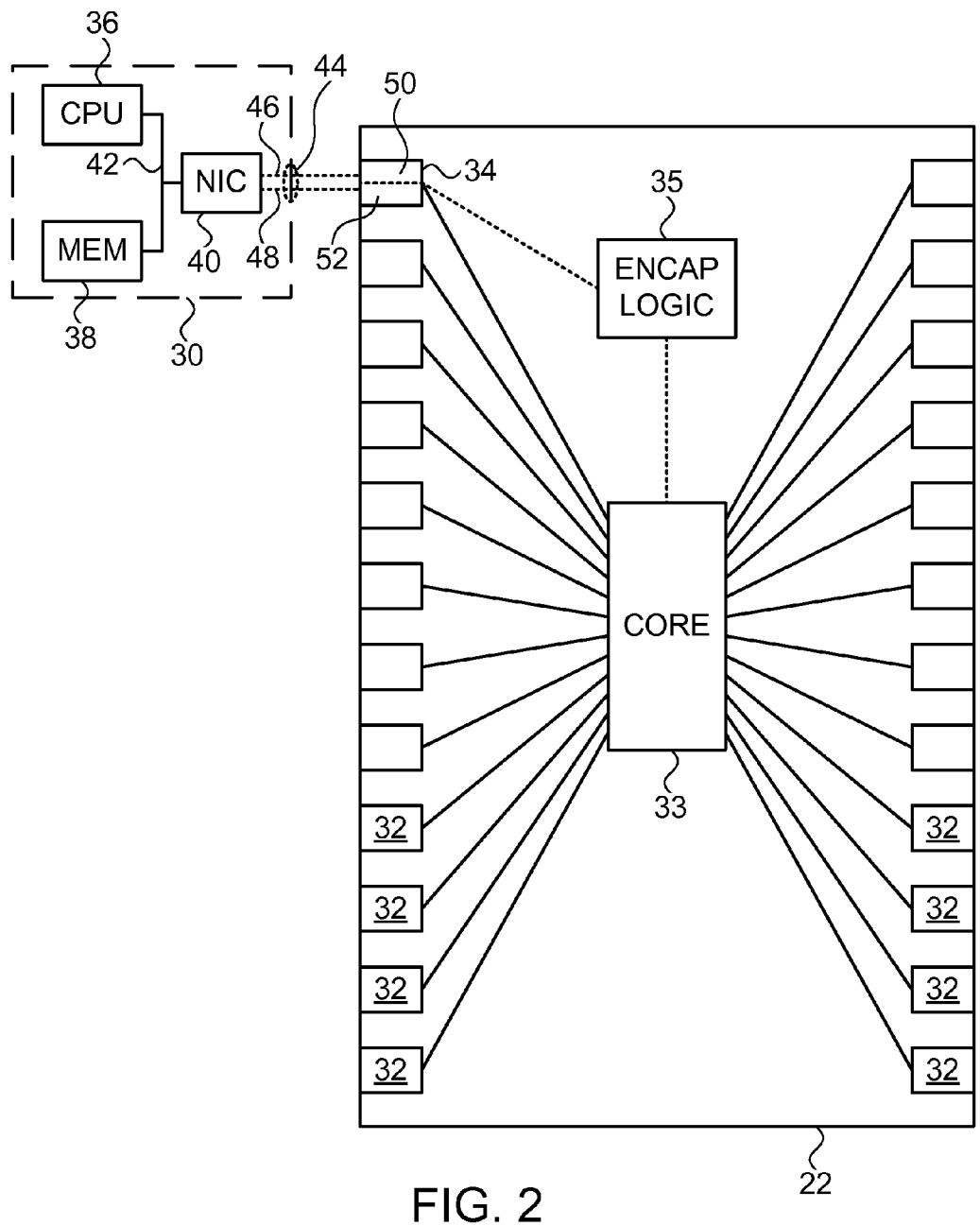
FIG. 2 is a block diagram showing details of a switch with a connected management processor, in accordance with an embodiment of the present invention.

FIG. 2 is a block diagram showing details of switch 22 with the attached host processor 30, in accordance with an embodiment of the present invention. Switch 22 comprises multiple ports 32 for connection to network 20, interconnected by a core 33, which forwards traffic among the ports. In addition, the switch comprises a management port 34, for connection to host processor 30. The host processor comprises a CPU 36 and a memory 38, which are connected by a suitable bus, for example a PCI Express® (PCIe) bus, to a NIC 40. In an IB network, NIC 40 is termed a host channel adapter (HCA), and port 34 is identified as port 0, but as noted earlier, the principles described herein may similarly be applied in networks of other types.

Port 34 is a single physical port, which is connected by a single physical IB link 44 to NIC 40. Internally, however, switch 22 and NIC 40 define two logical ports 50, 52 on physical port 34, connected by corresponding logical links 46, 48 to the NIC. Logical port 50 serves as the destination for management traffic that is addressed to port 0, while logic port 52 is the destination for application traffic, such as RDMA packets, to be processed by host processor 30. Logical port 52 is assigned a different port number (not zero) by switch 22, and core 33 is programmed to forward traffic for both this port number and for port 0 to and from physical port 34. Encapsulation logic 35 in switch 22 and in NIC 40 (not shown) encapsulates and decapsulates management packets that pass between switch 22 and NIC 40 on port 0. These management packets are transmitted and received by the NIC using QP0 and QP1, while the remaining queue pairs supported by the NIC may be used for application traffic, which is not encapsulated.

To SM 26 and to other elements in network 20, switch 22 thus appears to have one more port than the number of actual physical ports on the switch. In answering topology discovery queries from SM 26, the SMA running on CPU 36 lists both of these logical ports 50 and 52 in its responses. As a result, SM 26 assigns each of ports 50 and 52 its own LID. Management packets in network 20 will then be addressed to the LID of port 50, while application packets will be addressed to the LID of port 52. As noted earlier, such application packets may be used in RDMA operations to and from memory 38, as well as in other types of data transmission and command packets, just as if host processor 30 were one of hosts 24.

Figure 3:
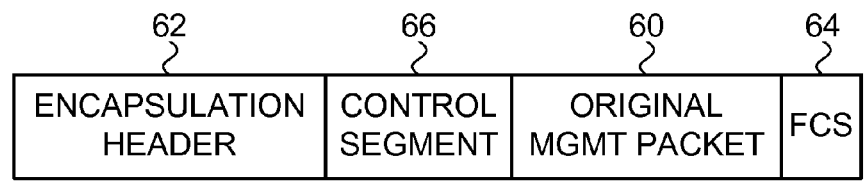
FIG. 3 is a block diagram that schematically illustrates an encapsulated management packet, in accordance with an embodiment of the present invention.

FIG. 3 is a block diagram that schematically illustrates an encapsulated management packet conveyed between port 34 and NIC 40, in accordance with an embodiment of the present invention. This encapsulation format is used, generally speaking, for both incoming management packets directed to port 0 of switch 22 from network 20 and outgoing management packets generated by SMA software running on CPU 36 and directed via switch 22 to the network. These management packets, as they are transmitted over network 20 and processed by the SMA software, have the form of an original management packet 60. The encapsulation performed by switch 22 and NIC 40, which are trusted entities, ensures that user software running on CPU 36 cannot (whether by malice or by accident) invoke unauthorized management functions in a way that could interfere with the proper operation of network 20. In the present embodiment, only management packets are encapsulated in this fashion, while application packets (and other traffic) are transmitted via port 52 without encapsulation.

To send an outgoing original management packet 60, software running on CPU 36 adds a control segment 66 and passes the packet to NIC 40. The NIC encapsulates the packet by adding an encapsulation header 62, along with a frame check sequence (FCS) 64, such as a cyclical redundancy code (CRC) computed over the encapsulated packet. Encapsulation header 62 has the form of a conventional IB packet header, typically (although not necessarily) of the unreliable datagram (UD) transport service type. The destination LID (DLID) of the encapsulation header is the LID of logical port 50 (i.e., management port 0), while the destination QP is a QP number that is preconfigured for management functions. Similarly, in an Ethernet switch, the destination MAC will be the MAC address of port 50, and the Ethertype in encapsulation header 62 is a predefined type number that is assigned to management packets of this sort. Upon receiving the encapsulated packet with header 62, core 33 recognizes it as a management packet and passes it to logic 35 for processing.

Control segment 66 indicates to logic 35 the sort of processing that is required. For example, the control segment may indicate that logic 35 should decapsulate original packet 60 and transmit the original packet onward through network 20. In this case, control segment 66 may include a base header with transmission instructions. Alternatively, the control segment may indicate that the management packet contains configuration instructions, such as register values, to be implemented in the logic of switch 22 itself.

Incoming management packets 60 that arrive from network 20 through one of ports 32 with the destination address of port 50 are similarly encapsulated by logic 35 before being delivered via physical port 34 to NIC 40. In this case, too, encapsulation header 62 contains a suitable destination address and QP number (or Ethertype). Control segment 66 for incoming management packets may have the form of a completion queue element (CQE), which is passed by NIC 40 to CPU 36, along with original management packet 60, for processing by software. The CQE may be used to identify the software process on CPU 36 that should be notified of the arrival of management packet 60.

As noted earlier, although the implementation described above includes certain features that are specific to IB networks, the principles of the above embodiments may similarly be applied in other sorts of networks, such as Ethernet networks. Ethernet standards do not mandate the use of a subnet manager, nor do they allocate a specific port (such as port 0 in IB switches) for management traffic. Ethernet switches are subject to management protocols, however, and the corresponding management functions are typically handled by a suitable processor embedded in the switch. In an embodiment of the present invention, however, these management functions of the switch may be handled by an external processor, which is connected to the switch by a dedicated Ethernet link on one of the switch ports. The physical port of the switch to which this processor is connected will have one logical port identifier that is used internally by the switch for management traffic, along with an additional port identifier that is used in forwarding application traffic to and from the port.

Additionally or alternatively, host processors may be connected to the management port of a switch in other configurations. For example, the management port may have a dedicated toggle attached to the port, which passes application traffic via a suitable NIC to a host processor, while passing management traffic to a separate CPU running SMA software. This latter CPU may be connected to the port toggle via its own NIC, or alternatively, the port toggle may have a direct bus connection, such as a PCIe bus, to the CPU.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a switch, which comprises switching logic, multiple ports for connection to a network, and a management port, and which is configured to assign both a first link-layer address and a second link-layer address to the management port; and
a host processor, comprising:
a memory;
a central processing unit (CPU), which is configured to run software implementing a management agent for managing functions of the switch; and
a network interface controller (NIC), which is connected to the management port and is configured to convey incoming management packets, which are directed by the switch to the first link-layer address, to the CPU for processing by the management agent, and to write directly to the memory data contained in incoming remote direct memory access (RDMA) packets, which are directed by the switch to the second link-layer address.

2. The apparatus according to claim 1, wherein the NIC is configured to convey outgoing management packets from the management agent to the switch for transmission over the network, and to generate outgoing RDMA packets for transmission via the switch over the network.

3. The apparatus according to claim 1, wherein the management agent is configured to send, via the switch over the network to a subnet manager, a subnet management packet containing port numbers of at least some of the multiple ports, including different first and second port numbers that are both assigned by the switch to the management port, thereby causing the subnet manager to assign the first link-layer address to the first port number and the second link-layer address to the second port number.

4. The apparatus according to claim 3, wherein the first port number is port zero.

5. The apparatus according to claim 1, wherein the switch is configured, upon receiving an incoming management packet directed from the network to the first link-layer address, to encapsulate the incoming management packet before conveying the encapsulated incoming management packet to the management port.

6. The apparatus according to claim 5, wherein incoming packets directed from the network to the second link-layer address are conveyed by the switch to the management port without encapsulation.

7. The apparatus according to claim 5, wherein the switch is configured to direct the incoming management packets, after encapsulation, to a first queue pair (QP) for processing by the NIC, while directing the incoming RDMA packets to one or more second QPs, different from the first QP, for processing by the NIC.

8. The apparatus according to claim 5, wherein the NIC is configured to decapsulate the encapsulated incoming management packet before passing the incoming management packet to the CPU for processing by the management agent.

9. The apparatus according to claim 5, wherein the NIC is configured, upon receiving an outgoing management packet directed from the management agent to the network, to encapsulate the outgoing management packet before conveying the encapsulated outgoing management packet via the management port to the switch.

10. A method for communication, comprising:
assigning both a first link-layer address and a second link-layer address to a management port of a switch, which comprises multiple ports for connection to a network;
coupling to the management port a host processor, comprising a memory and a central processing unit (CPU), which runs software implementing a management agent for managing functions of the switch;
conveying incoming management packets, which are directed by the switch to the first link-layer address, via the management port to the CPU for processing by the management agent; and
writing directly to the memory, via the management port, data contained in incoming remote direct memory access (RDMA) packets, which are directed by the switch to the second link-layer address.

11. The method according to claim 10, and comprising conveying, via the management port, outgoing management packets from the management agent to the switch for transmission over the network and outgoing RDMA packets for transmission via the switch over the network.

12. The method according to claim 10, and comprising sending, via the switch over the network to a subnet manager, a subnet management packet containing port numbers of at least some of the multiple ports, including different first and second port numbers that are both assigned by the switch to the management port, thereby causing the subnet manager to assign the first link-layer address to the first port number and the second link-layer address to the second port number.

13. The method according to claim 12, wherein the first port number is port zero.

14. The method according to claim 10, wherein conveying the incoming management packets comprises, upon receiving an incoming management packet directed from the network to the first link-layer address, encapsulating the incoming management packet before passing the encapsulated incoming management packet to the management port.

15. The method according to claim 14, wherein incoming packets directed from the network to the second link-layer address are conveyed by the switch to the management port without encapsulation.

16. The method according to claim 14, wherein passing the encapsulated incoming management packet comprises directing the incoming management packet, after encapsulation, to a first queue pair (QP) for processing by the NIC, while directing the incoming RDMA packets to one or more second QPs, different from the first QP, for processing by a network interface controller (NIC) of the host processor.

17. The method according to claim 14, and comprising decapsulating the encapsulated incoming management packet in a network interface controller (NIC) of the host processor before passing the incoming management packet to the CPU for processing by the management agent.

18. The method according to claim 14, and comprising, upon receiving, in a network interface controller (NIC) of the host processor, an outgoing management packet directed from the management agent to the network, encapsulating the outgoing management packet in the NIC before conveying the encapsulated outgoing management packet via the management port to the switch.

* * * * *